United States Patent [19]

Kay et al.

[11] Patent Number: 5,367,559
[45] Date of Patent: Nov. 22, 1994

[54] SEQUENTIAL POWER ESTIMATION FOR CELLULAR SYSTEM HANDOFF

[75] Inventors: Stanley Kay, Rockville; Youngky Kim, N. Potomac; Lou King, Mt. Airy; Ashok D. Mehta, Gaithersburg, all of Md.; Charles Barnett, Sterling, Va.

[73] Assignee: Hughes Aircraft Company, Los Angeles, Calif.

[21] Appl. No.: 881,271

[22] Filed: May 11, 1992

[51] Int. Cl.$^5$ ............................................. H04M 11/00
[52] U.S. Cl. ................................. 379/60; 455/33.2
[58] Field of Search ........................... 379/60, 59; 455/33.2–33.4, 52.1, 52.3

[56] References Cited

U.S. PATENT DOCUMENTS

| | | | |
|---|---|---|---|
| 4,549,311 | 10/1985 | McLaughlin | 455/52.3 |
| 4,718,081 | 1/1988 | Brenig | 379/60 |
| 4,829,554 | 5/1989 | Barnes et al. | |
| 4,912,756 | 3/1990 | Hop | |
| 4,972,456 | 11/1990 | Kaczmarek et al. | 379/60 |
| 5,042,082 | 8/1991 | Dahlin | |
| 5,081,671 | 1/1992 | Raith et al. | |
| 5,170,485 | 12/1992 | Levine et al. | 455/33.2 |
| 5,175,867 | 12/1992 | Wejke et al. | 455/53.1 |
| 5,187,808 | 2/1993 | Thompson | 455/33.1 |
| 5,203,010 | 4/1993 | Felix et al. | 379/60 |
| 5,239,667 | 8/1993 | Kanai | 455/33.2 |

OTHER PUBLICATIONS

"Handover and Channel Assignment in Mobile Cellular Networks" Sirin Tekinay and Bijan Jabbari, IEEE Communications Magazine Nov. 1991.

*Primary Examiner*—Curtis Kuntz
*Assistant Examiner*—Dwayne D. Bost
*Attorney, Agent, or Firm*—Gordon R. Lindeen, III; William J. Streeter; Wanda K. Denson-Low

[57] ABSTRACT

Cellular handoff is improved by tailing or adapting the measurement time based on the characteristics of the received signal intensity or power. More particularly, base stations typically measure mobile signal power in order to determine the necessity for handoff and the identity of a new cell. The measurement time must be of a duration which is sufficient to characterize the environment of the mobile. In accordance with the invention, the duration of the measurement time is determined from the received signal itself. Once the duration of the measurement time is determined, that data may be passed to a target cell along with other handoff data.

13 Claims, 4 Drawing Sheets

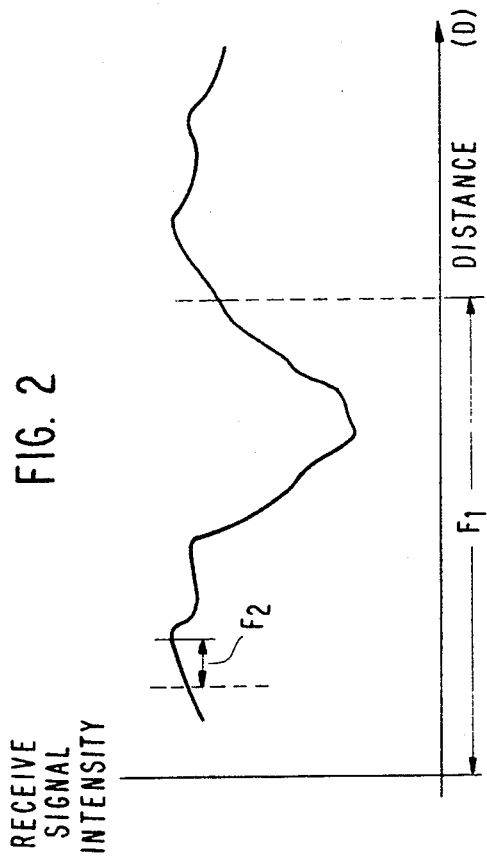
FIG. 1. (PRIOR ART)
FIG. 2
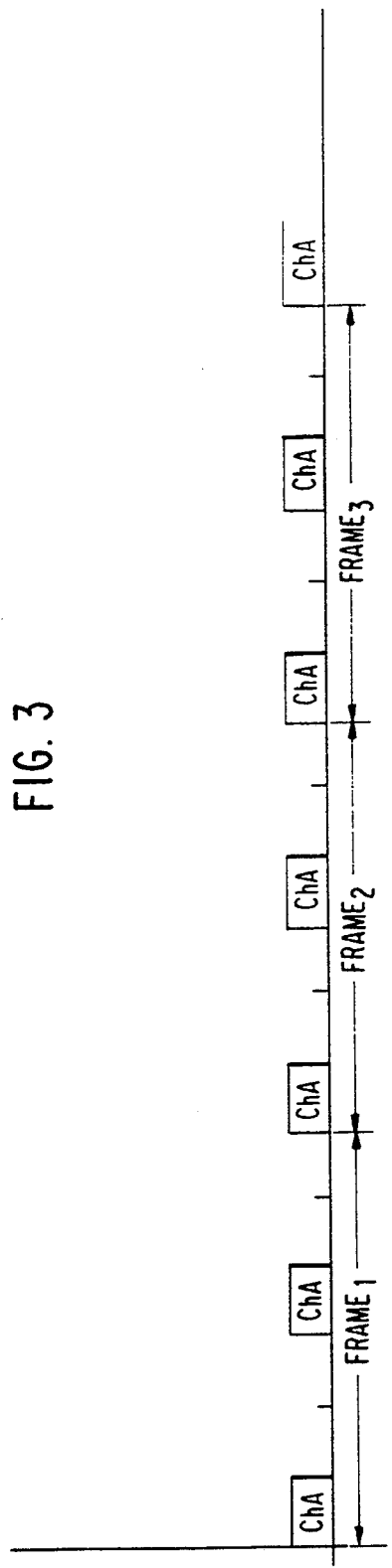
FIG. 3

SEQUENTIAL POWER ESTIMATION FOR CELLULAR SYSTEM HANDOFF

DESCRIPTION

1. Technical Field

The present invention relates to improvements in cellular telephone technology and more particularly improvements in the handoff process.

2. Background Art

Cellular telephone technology has now been in use for more than ten years. The cellular telephone concept subdivides a geographic region into a plurality of cells. Each cell contains either a base station to control the call or plural base stations to control different sectors of the call. Mobile units communicate by radio to the base stations which in turn are connected via land lines to a switching office. Cells or cell sectors are assigned their own carrier frequency bands so that interference from adjacent cells or sectors is limited. Typically, the carrier frequencies employed in a cell or cell sector of a cluster of cells are unique, but those carrier frequencies can be reused in adjacent cell clusters. One example of this architecture is the Advanced Mobile Phone Service (AMPS). Since the introduction of AMPS, the capacity provided by that architecture has, at least in some localities, been exhausted so that further capacity improvements have been found necessary. The Telecommunications Industry Association has more recently promulgated a new standard IS-54 which allows the AMPS architecture to co-exist along with an architecture based on time division multiplexing. Nevertheless, even the new time division multiplexing architecture requires a similar cell architecture.

Conventional cellular telephony uses one of two different geometries for the area controlled by a base station. One of these geometries is generally a closed hexagonal region. For finer control, the alternative geometry has the hexagonal region subdivided into sectors, i.e. three or six sectors per hexagon. Typically, the hexagonal region is served by a single base station optimally located at the center of the hexagon. In the alternative architecture, the base stations are located at the vertices of the hexagons with directional antennas, each directed to a particular sector of the hexagon. Because this invention works with either geometry, terminology is simplified by ignoring the distinction between these geometries. Consequently, throughout the remaining portion of this application, the term "cell" is used to designate either the generally hexagonal region or the segment or sector of such a hexagonal region.

As a consequence of a geographic mapping of operating carrier frequencies, it is essential for a mobile station to be handed off from one cell to another as it changes location. It has been recognized that this handoff is one of the most critical aspects of operation of a cellular telephone system.

Handoff processes are described in U.S. Pat. Nos. 4,829,554; 4,912,756; 5,042,082; 5,081,671 and Tekinay, "Handover and Channel Assignment in Mobile Cellular Networks, *IEEE Communications Magazine,* November 1991, pp. 42 et seq.

It is also known that mobile radio propagation is subject to short-term fluctuations in power generally characterized as Rayleigh or multipath fading. The signal power can fluctuate as much as 30 dB over half a wavelength of the RF carrier. Reliable handoff between cells is essential for high quality cellular operation. An important part of the handoff process is the ability to measure the average power in the physical location of the mobile station. Short term fluctuations must be smoothed or averaged in order to obtain a good measure of the average power received from the locations. This averaging should be done over several cycles of the small scale fluctuations. Since the duration of these several cycles depends on the wavelength, the averaging time depends on the time needed for the mobile to traverse several wavelengths. This in turn is related to vehicle speed. The slower the speed of the vehicle, the longer the averaging time is required for an accurate measurement. In the absence of a priori knowledge of the vehicle speed, the system must allocate a time duration to the measurement process which satisfies worst case conditions, i.e. is adequate for a slow moving vehicle. The alternative, assuming something less than worst case conditions, will necessarily result in sub-par performance for those slow moving vehicles. However, allocating a measurement time sufficient to provide an accurate measurement for the slow moving vehicles penalizes the handoff operation with respect to high speed vehicles. Because of the vehicle's high speed, its measurement process could be accomplished in a significantly shorter time. Moreover, unnecessarily delaying the handoff process for a high speed vehicle could result in sub-par handoff performance or even losing the call.

SUMMARY OF THE INVENTION

The invention overcomes the problem of devoting sufficient time to measuring mobile power without unnecessarily penalizing a fast moving vehicle. This advantage is obtained by recognizing that the system can obtain an estimate of that time necessary for accurate measurement of mobile power by monitoring the statistical variations in the mobile power samples which are detected. More particularly, mobile power is measured for a first predetermined duration such as 160 ms or four 40 ms frames. In terms of the presently-implemented standards, a full rate coded mobile will transmit two 6.67 ms packets per frame, or eight packets per 160 ms. After measuring the mobile signal power at a rate of 1.82 KHz, well within conventional technology, a determination is made as to whether or not there is a significant variation in signal intensity in each of the eight packets. If there is such a significant variation in each of the eight packets, then the measurements already concluded are an accurate measurement of the mobile power.

On the other hand, if there is not a significant variation in amplitude over each of the eight packets, then a further measurement is taken for a further predetermined duration, for example two additional frames or four more packets. With this further information, rather than examining the intensity variation per packet, the examination is to see if there is an intensity variation from packet to packet. If a significant variation is determined, then the number of samples already collected are adequate for measurement purposes. On the other hand, still further sampling of additional packets can be implemented in the event that there is not a significant variation in intensity from packet to packet.

While the method just described refers to the measurement for a predetermined duration and the optional measurement for a further predetermined duration and still a further measurement time in the event certain conditions are not met, it should be apparent that the number of different measuring durations beyond the first two (the predetermined duration and the further predetermined duration) are optional and depend on a tradeoff between measurement complexity and time saving.

Typically, the handoff process involves a channel unit in the serving cell, the cell with which the mobile is in communication. The channel unit will be receiving and demodulating the RF carrier from the mobile. As the mobile moves through the coverage area for the cell, the channel unit continues to receive its signal. Over this time period the channel unit observes the fading characteristics of the transmission and estimates the amount of time needed to make an accurate power measurement. Typically, the channel unit relays the power measurement information to a handoff controller which determines whether power measurements should be made by locating receivers in other cells (target cells) to support the handoff process. The handoff controller can request neighboring cells to perform the handoff measurement. This request, from the handoff controller, contains a recommended duration of the locating receiver measurements. The recommended duration may be obtained from the serving cell.

The duration information comes from the channel unit or locating receiver which demodulates the signal received from the mobile. This signal contains implicit information about the mobile's local propagation environment. This information takes the form of power and phase fluctuations which can be measured in the channel unit. The channel unit samples the power level of the signal and determines its auto-correlation. Other implementations can use other properties of the received signal. The width of the main lobe of the auto-correlation function determines the amount of averaging needed.

When the modulation is digital, the channel units extracts information about the phase fluctuations on the channel. The speed at which the phase varies is related to the vehicle speed and serves as an additional input into the power measurement algorithms.

This class of statistical processing is called sequential estimation where the duration of the test varies with the nature of the samples.

Some environments may not produce short term fluctuations which are referred to above. These are almost always locations with direct line of sight between the mobile and the base station. In these circumstances, however, a hand-off operation is rarely required.

Generally, and following the invention, the handoff process measurement time constants can be adapted to the local environment of the mobile in order to accelerate the handoff process. Applying the present invention adds a new parameter to the locating receiver request. The channel unit which is in contact with the mobile in its serving cell estimates the required measurement period from data that has been collecting over the duration of the call.

The sequential type measurement can be generalized as follows: the serving or target cell can sample and average the received signal power over $N_1$ frames. Based on this sampling, the statistics of the received signal are calculated which describe whether the fading rate is higher or lower than a threshold rate $R_1$. If the fading rate is higher than the threshold rate $R_1$ then the measurement is concluded and the current average power is accepted as the eligible measurement. Alternatively, if the calculated fading rate is less than the threshold $R_1$, then the base station continues sampling the received signal and averages the received signal power over $N_2$ frames (where $N_2$ is greater than $N_1$). Based on the sampling over $N_2$ frames, the base station calculates statistics describing whether the fading rate is higher or lower than a second threshold $R_2$. If the calculation indicates that the fading rate is higher than $R_2$, then the measurement is terminated and the current average power measurement is accepted as the desired power measurement. Clearly, the fading rate $R_2$ is less than the fading rate $R_1$. Also, the steps of continuing the sampling process, averaging the received power and calculating the fading rate over the entire sampling period can be continued and the threshold fading rate against which the calculated fading rate is compared is continually reduced. This continued iteration is terminated when the calculated fading rate is larger than some preselected threshold and/or a predetermined time out duration for the entire measurement is exceeded.

BRIEF DESCRIPTION OF THE DRAWINGS

The present invention will now be described in the following portions of this specification so as to enable those skilled in the art to make and use the same, wherein:

FIG. 1 is a block diagram showing the apparatus employed with the present invention;

FIG. 2 illustrates the variation of signal power with respect to distance;

FIG. 3 shows a sequence of packets and several frames,

DETAILED DESCRIPTION OF PREFERRED EMBODIMENTS

Figure 4:
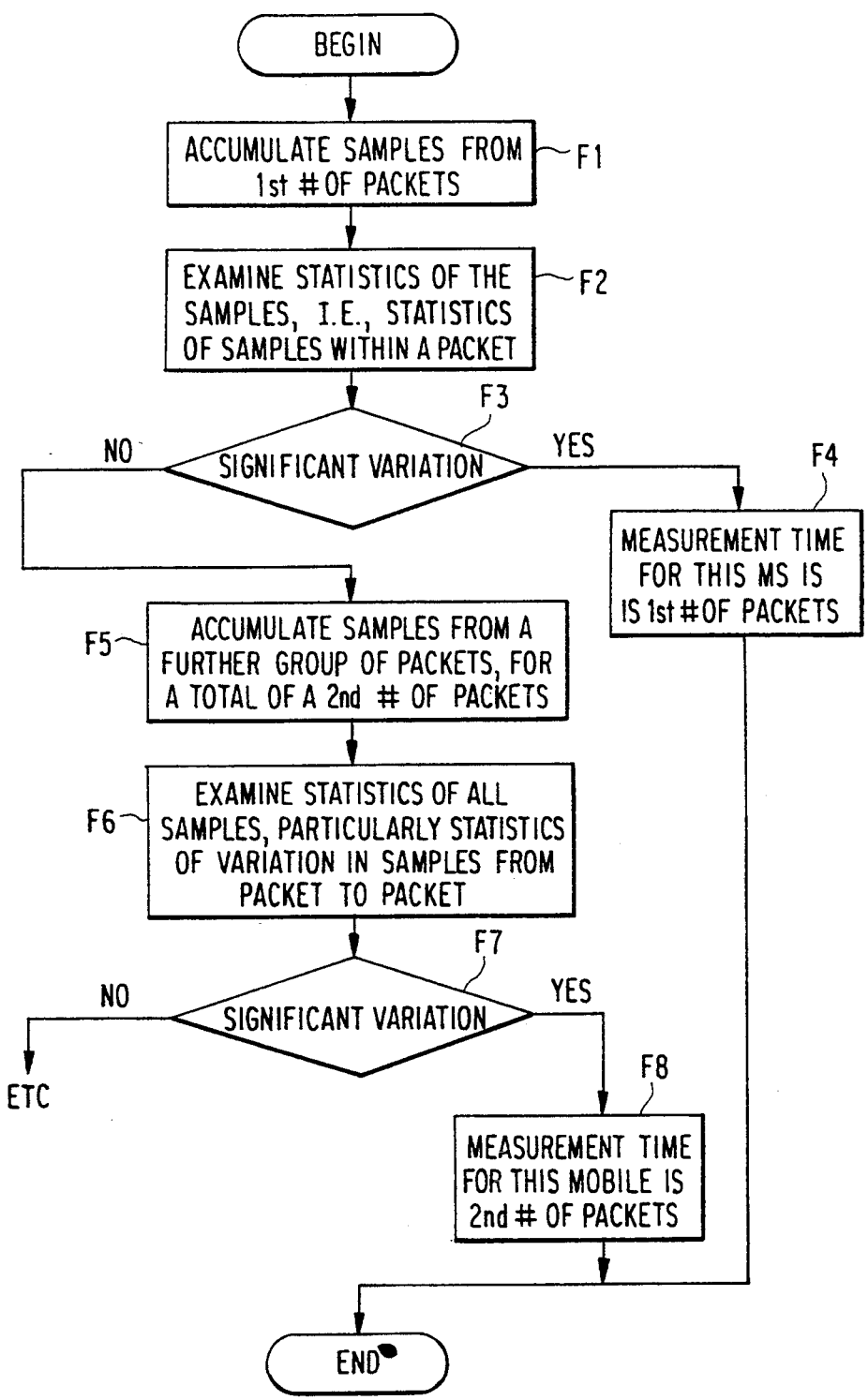
FIG. 4 is a flow diagram showing processing in accordance with the one embodiment of the present invention.

FIG. 1 illustrates the major components of a typical cellular telephone system involved in a handoff process. More particularly, the mobile station V is shown moving with respect to a base station 1 and a base station 2. The signal received at the MS from any base station depends on the totality of the propagation environment. Due to reflections and interaction with stationary and other moveable objects, the propagation environment can be considered to set up a standing wave pattern such as is illustrated in FIG. 2. FIG. 2 plots received signal intensity vs. distance. FIG. 2 can be considered to illustrate a constant or mean signal power with fluctuations superimposed on that mean power. The power variation over the distance labelled $F_1$ is the power intensity variation that would be seen by a vehicle moving at a given speed during one frame time, i.e. 40 ms. However, for a vehicle moving at a significantly slower speed, the variation of the standing wave illustrated in FIG. 2 that would be seen within one frame time may be as small as that shown by $F_2$. Clearly, the measurement over $F_1$ produces a more accurate measurement of the propagation environment than does the measurement over the distance $F_2$. Unfortunately for cellular telephony, the speed at which a mobile station is moving is unknown. Because power measurements are an important part of the handoff process, and because handoffs must be handled quickly to avoid degrading the voice quality of the telephone connection, conventional cellular telephony systems are hampered by the need to fix the measurement duration. The operator of a cellular telephony system must make some estimate of the distribution of speed of mobile stations and provide enough measurement time to accurately measure the propagation environment for the large majority of mobile stations. Because some of these mobile stations are moving faster than the average, it follows that unnecessary measurement time is expended in taking measurements on fast moving mobiles.

There are two consequences which flow from unnecessarily extending the measurement duration, and both are adverse to optimum operation of a cellular telephone system. In the first place, devoting excessive measurement time to a mobile means that there is less measurement time available for other users. In addition, it is the fast moving mobile that requires a quicker handoff operation in order to maintain call quality, but it is just this mobile that is discriminated against by unnecessarily delaying the measurement process.

FIG. 3 represents the frame format of the IS-54 standard showing the location of typical channel A for three sequential frames. More particularly, as shown in FIG. 3, each channel occupies two time slots in a frame which has a capacity of six time slots. Because there are two bursts per frame, in four frames there will be eight bursts in a single channel.

When a handoff process is initiated, the serving station 1 communicates with the handoff controller, typically at a Base Switching Center or a MTSO. The handoff controller, as part of the handoff process, may direct a target cell such as station 2 to perform power measurements on the mobile station V. In addition, the handoff process itself will be initiated by station 1 based on its power measurements of the signal from the mobile station V. The present invention is useful in determining the time that should be allocated to the measurement process, either at the serving cell station 1 or at the target cell station 2.

FIG. 4 shows the processing which will be engaged in by the channel unit at a serving station to monitor the signal from a MS. When a measurement is necessary, the receiver tunes to the particular channel (this includes tuning to the appropriate carrier frequency as well as monitoring the particular time slot or slots in the frame allocated to the channel being measured). Samples of the received signal are accumulated from a first given number of packets in the channel. For example, step F1 can be used to accumulate samples from four frames or eight packets. At the conclusion of step F1, step F2 examines the statistics of the samples, particularly, the statistics of the samples within a packet. The next function is a decision point which branches depending on whether there is a significant variation within the samples in each of the packets. If there is a significant variation, then the measurement process for this particular mobile has been completed and the measurement time for this mobile is the first number of packets, for example four frames. The measurement time parameter can be used by other stations performing a measurement on this mobile.

On the other hand, if the decision point F3 does not branch to step F4 because there is not a significant variation among samples within a packet, then function F5 is performed to continue the accumulation of samples from a second number of packets, i.e. two additional frames or a total of six frames. Function F6 then examines the statistics of all of the samples accumulated throughout the six frames. Function F6 examines whether or not there is a significant variation from packet to packet. Function F7 branches on the result. If there is a significant variation, then function F8 is performed to set the measurement time for this mobile at the second number of packets, i.e. twelve packets (six frames). Otherwise, the process can continue with examination of the statistics accumulated over the previous samples as well as the succeeding samples. The processing may be terminated after another measurement if the total time for sample accumulation is appropriate for the typical worst case mobile. Otherwise, processing can continue in this fashion (accumulation of further samples and branch on the result) until some predetermined timeout is exceeded. Such a timeout would be selected in accordance with the results of a worst case analysis as the time necessary to accumulate an appropriate measurement for a slow moving mobile.

Figure 5:
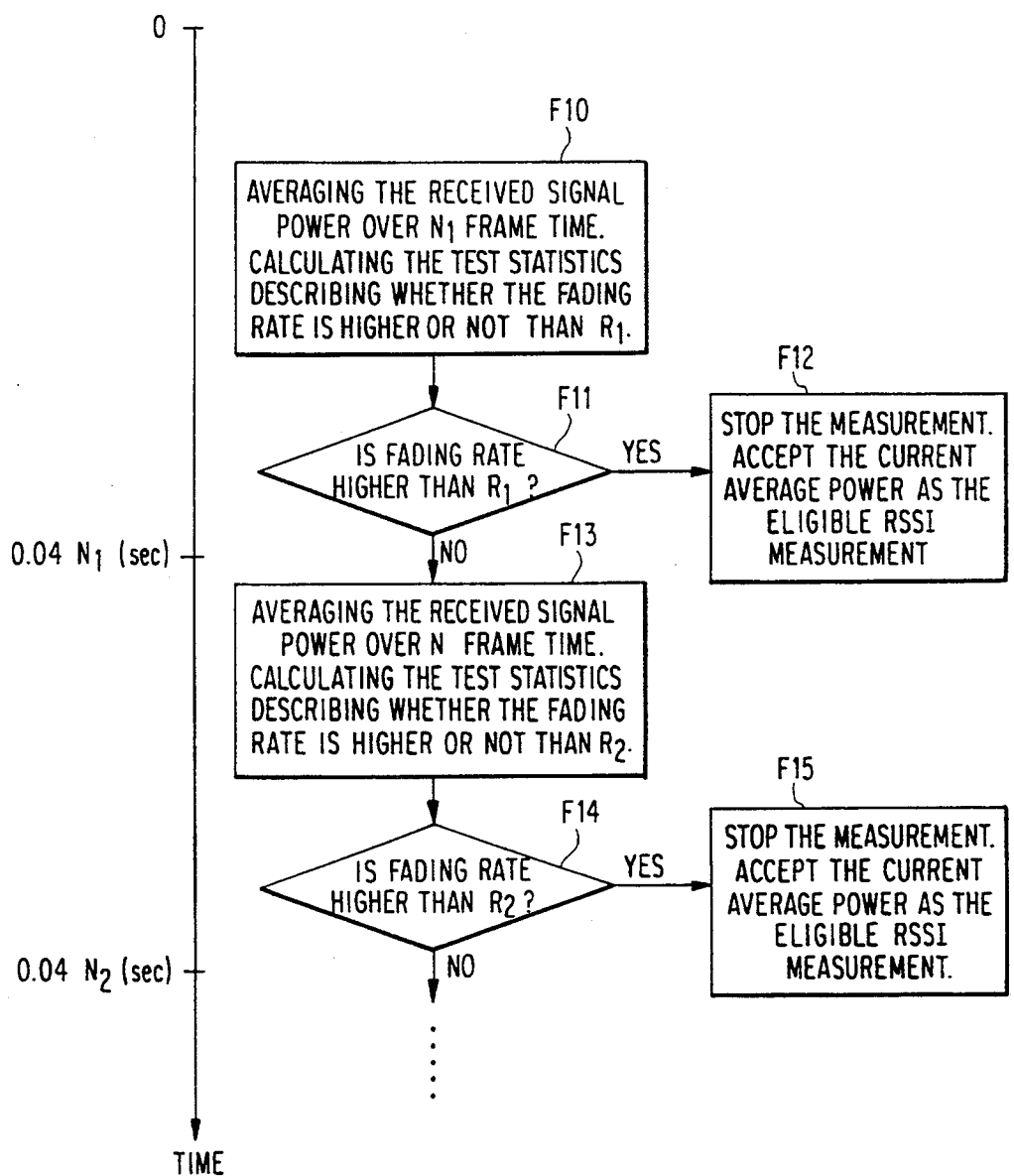
FIG. 5 is a flow diagram showing processing in accordance with another generalized embodiment of the present invention.

FIG. 5 illustrates generalized processing that can be employed in taking power measurements on the signal from a mobile. The time scale at the left (time increases downward) represents the time required to accumulate the necessary samples for the different processing steps. Since each frame is 40 ms in duration, $N_1$ frames is $0.04 N_1$ seconds in duration, etc. As shown in FIG. 5, the first function, F10, accumulates samples from the mobile over $N_1$ frames (for example four frames). Once samples from $N_1$ frames have been accumulated, then the statistics of those samples are calculated to determine the relationship between the calculated fading rate and a first threshold fading rate $R_1$. Function F11 branches on the result. If the calculated fading rate in function F10 is greater than the threshold $R_1$, then function F12 is performed to terminate the measurement and accept the current average power as the appropriate measurement.

Alternatively, if the comparison at function F11 indicates that the calculated fading rate is not higher than $R_1$, then function F13 is performed to average the received signal power over $N_2$ frames (for example eight frames). Once the desired number of samples has been accumulated, function F13 calculates the statistics and particularly the fading rate. Function F14 branches on the comparison between the calculated fading rate and the second threshold fading rate $R_2$. If the fading rate calculated by function F13 is greater than $R_2$, then the measurement is terminated at function F15 and the calculated average power measurement is accepted. On the other hand, if the decision point at function F14 indicates that the calculated fading rate is less than the second threshold $R_2$, processing can continue to take samples over a longer duration, calculate fading rates and compare those fading rates to other fading rate thresholds. Generally, the process can be concluded when:

(1) The calculated fading rate is greater than the appropriate threshold (wherein the threshold continually decreases with longer and longer measurement times), or (2) The measurement time extends beyond some predetermined time out duration.

Figure 6:
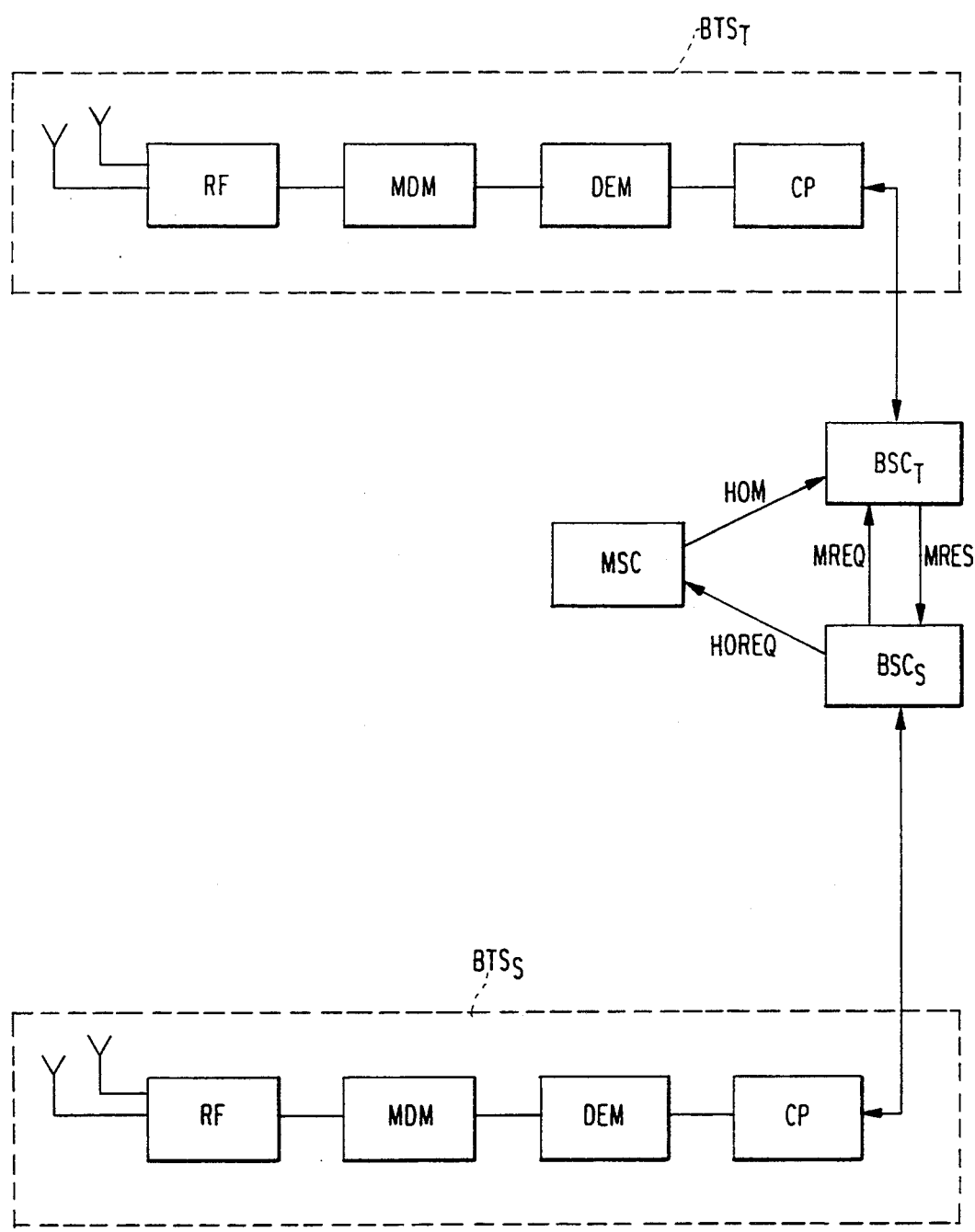
FIG. 6 is a further detail of the fixed equipment of FIG. 1.

FIG. 6 is a further detail showing the equipment implementing the foregoing functions. More particularly, station 1, the serving cell is illustrated at the bottom of FIG. 6 with the designation $BTS_S$, station 2, the target cell, is represented in FIG. 6 at the top with the designation $BTS_T$. A handoff controller is illustrated as including the Base Switching Center associated with the serving cell $BTS_S$ and designated $BSC_S$, and a similar Base Switching Center associated with the target cell, designed $BSC_T$ and a mobile switching center MSC. Those skilled in the art will understand that FIG. 6 then represents not only a handoff from one serving cell to another but where those cells are associated with different base switching centers. While this is only one example of application of the invention, it is also within the scope of the invention that a handoff from a serving cell to a target cell can be accomplished wherein both cells are served by the same base switching center. In addition, while FIG. 6 illustrates a handoff, the system proposed by the assignee of this application, which is more completely described in co-pending application Ser. No. 07/622,232 filed Dec. 6, 1990, the principles of the present invention can be used with cellular telephone systems having different architectures.

As seen in FIG. 6, each BTS includes a radio frequency stage coupled to a Modulator Downconverter Module (MDM), which operates at an intermediate frequency. MDM in turn is coupled to a Demodulator Module (DEM) which actually performs the measurement processes shown in FIGS. 4 and 5. The DEM in turn is coupled to a Control Processor (CP). The CP interprets commands received from the associated BSC and controls the elements of the cell, DEM, MDM and RF accordingly. Measurement information, in turn, is passed on by the CP to the associated BSC.

As is illustrated in FIG. 6, measurement requests (MReq) and measurement results (MRes) are exchanged between the serving base switching center ($BSC_S$) and the target base switching center ($BSC_T$). In addition, when handoff is appropriate, the $BSC_S$ sends a handoff request message (HOReq) to the MSC. The MSC responds with a handoff message (HOM) to a potential target cell via the associated $BSC_T$.

Accordingly, this application has described a new technique in association with mobile handoff; a technique which adapts the measurement time to the received signal. Application of the invention provides a new parameter in the handoff process, specifically, the measurement time.

This measurement time parameter can be provided, from the handoff controller to a target cell, to allow the target cell to tailor the measurement time to the particular mobile under investigation. Those skilled in the art will understand that the invention is not restricted to the two processing examples described therein, but that other processing variations come within the spirit and scope of the invention which is to be construed from the claims attached hereto.

We claim:

1. In a method of handing off a mobile station from a serving cell to a target cell in a cellular telephone system, based on a determination of signal intensity from said mobile station, a method for measuring said signal intensity comprising the steps of:
    a) sampling a received signal intensity from the mobile station for a predetermined duration, and
    b) determining from samples collected in step a) whether further sampling is or is not required to determine said received signal intensity to within a predetermined degree of accuracy.

2. A method as recited in claim 1 further comprising the step of transmitting an indication of the determination of step b) to a target cell.

3. A method as recited in claim 1 wherein said sampling step includes:
    (a1) calculating from the samples collected in step (a) a calculated fade rate R,
and wherein said determining step (b) includes:
    (b1) comparing the calculated fade rate R to a threshold fade rate R1, and
    (b2) concluding that further sampling is not required if said calculated fade rate R exceeds said threshold fade rate R.

4. A method as recited in claim 3 wherein said determining step (b) further includes:
    (b3) concluding that further sampling is required if said calculated fade rate R does not exceed said threshold fade rate R.

5. A method as recited in claim 1 comprising the further steps, in the event that further sampling is determined to be required, of:
    c) sampling the received signal intensity from the mobile for a second predetermined duration, and
    d) determining from the samples collected in steps a) and c) if further sampling is or is not required to determine said received signal intensity to within said predetermined degree of accuracy.

6. A method as recited in claim 5 wherein the sampling is carried out at the serving cell.

7. A method as recited in claim 5 wherein the measurement is carried out at the target cell.

8. A method as recited in claim 7 comprising the further step of receiving, at a target cell, an indication from the serving cell of the required sampling duration required to determine the received signal intensity from the mobile station to within said predetermined degree of accuracy.

9. A method as recited in claim 5 further comprising the step of repeating steps c) and d) until either said received signal intensity has been determined to within said predetermined degree of accuracy or until a maximum sampling time has elapsed.

10. A method as recited in claim 9 further comprising the step of transmitting an indication of the number of repetitions of steps c) and d) to the target cell.

11. In a system for handing off a mobile station from one cell to another in a cellular telephone system based on a received signal intensity, an apparatus for measuring a received signal intensity comprising:
    a) means for sampling a received signal intensity from the mobile station,
    b) a controller including first means to control said sampling means to sample said received signal for a predetermined duration, and
    c) means for determining, from samples collected by the means for sampling, whether further sampling is or is not required to determine said signal intensity to within a predetermined degree of accuracy.

12. Apparatus as recited in claim 11 and further comprising means responsive to the means for determining for transmitting an indication of the determination to a target cell.

13. Apparatus as recited in claim 11 further comprising second means in said controller to control said sampling means to sample the received signal from the mobile station for a second predetermined duration.

* * * * *